US006102286A

United States Patent [19]

Hammond

[11] Patent Number: 6,102,286

[45] Date of Patent: Aug. 15, 2000

[54] INTEGRATED DATA ENTRY SYSTEM INCLUDING A CARD PROXIMITY SENSOR FOR SECURITY ACCESS CONTROL

[75] Inventor: Gerald E. Hammond, Tustin, Calif.

[73] Assignee: Hirsch Electronics Corporation, Irvine, Calif.

[21] Appl. No.: 09/041,262

[22] Filed: Mar. 12, 1998

[51] Int. Cl.[7] .......... G06K 5/00

[52] U.S. Cl. .......... 235/380; 235/382; 235/439; 902/4; 340/825.31; 340/825.34

[58] Field of Search .......... 235/379, 380, 235/382, 439, 451; 902/4, 20; 257/679; 340/325.31, 825.34

[56] References Cited

U.S. PATENT DOCUMENTS

| | | | |
|---|---|---|---|
| 4,032,931 | 6/1977 | Haker | 340/365 |
| 4,333,090 | 6/1982 | Hirsch | 340/365 |
| 4,479,112 | 10/1984 | Hirsch | 340/365 |
| 4,502,048 | 2/1985 | Rehm | 340/825.31 |
| 4,644,326 | 2/1987 | Villalobos et al. | 340/365 |
| 5,774,053 | 6/1998 | Porter | 235/381 |
| 5,880,444 | 3/1999 | Shibata et al. | 235/379 |

*Primary Examiner*—Donald Hajec
*Assistant Examiner*—Larry D Taylor
*Attorney, Agent, or Firm*—Blakely Sokoloff Taylor & Zafman LLP

[57] ABSTRACT

A method and apparatus for access control is disclosed. The apparatus comprises a keypad unit, proximity sensor, a card reader interface circuit, and a control circuit. The keypad unit displays a plurality of randomly generated symbols on a keyface which includes a plurality of keys. The keypad unit generates a signal representing one of the plurality of randomly generated symbols when a corresponding key on the keyface is activated. The proximity sensor senses the information encoded in a card held near the keypad unit. The proximity sensor is hidden within the keypad unit. The card reader interface circuit is coupled to the proximity sensor for reading the encoded information from the card. The control circuit is coupled to the keypad unit and the card reader interface circuit to convert the signal or the encoded information into an identification code.

21 Claims, 4 Drawing Sheets

INTEGRATED DATA ENTRY SYSTEM INCLUDING A CARD PROXIMITY SENSOR FOR SECURITY ACCESS CONTROL

BACKGROUND OF THE INVENTION

1. Field of the Invention

This invention relates to security access control. In particular, this invention relates to an integrated data entry system.

2. Description of Related Art

In many access control applications such as gate access, elevator control, and automatic teller machines (ATM), a keyboard or a card reader is used for access request entry. The user swipes the card through the card reader or enters a personal identification number (PIN) by pressing a series of numbers on the keypad. When the information encoded on the card or the PIN matches the information stored in database, the requested access is allowed.

Such data entry systems have a number of drawbacks. First, the keyboard unit and the card reader are usually separated, resulting in installation difficulties, especially in applications where space is important. Second, the data entry is not highly secure because a bystander may observe the key entry to know the secret PIN. Third, the card reader is not apparent to someone trying to compromise security. Fourth, the encoded information read from the card may be intercepted during transmission, compromising the system security.

Accordingly, there is a need in the technology to provide a compact and integrated data entry system that features both a highly secure keyboard and a proximity card reader.

SUMMARY OF THE INVENTION

The present invention discloses a method and apparatus for access control. The apparatus comprises a keypad unit, proximity sensor, a card reader interface circuit, and a control circuit.

The keypad unit displays a plurality of randomly generated symbols on a keyface which includes a plurality of keys. The keypad unit generates a signal representing one of the plurality of randomly generated symbols when a corresponding key on the keyface is activated. The proximity sensor senses the information encoded in a card held near the keypad unit. The proximity sensor is hidden within the keypad unit. The card reader interface circuit is coupled to the proximity sensor for reading the encoded information from the card. The control circuit is coupled to the keypad unit and the card reader interface circuit to convert the signal or the encoded information into an identification code.

BRIEF DESCRIPTION OF THE DRAWINGS

The objects, features and advantages of the present invention will become apparent from the following detailed description of the present invention in which.

DESCRIPTION OF THE PRESENT INVENTION

The present invention discloses a method and apparatus for an integrated data entry system for security access control. The system comprises a keypad unit, a card reader interface circuit, a proximity sensor, and a control circuit. The keypad unit displays a plurality of randomly generated symbols on a keyface which includes a plurality of keys. The keypad unit generates a signal representing one of the plurality of randomly generated symbols when a corresponding key on the keyface is activated. The card reader interface circuit is coupled to a card reader for reading information encoded in a card. The proximity sensor is hidden within the keypad unit and detects a movement of a proximity card, keypad, etc. near the keypad unit. The control circuit is coupled to the keypad unit and the card reader interface circuit to convert the signal or the encoded information into an identification code.

The present invention enhances the security protection for access control and provides many benefits including ease of installation, compactness, and flexibility.

Figure 1:
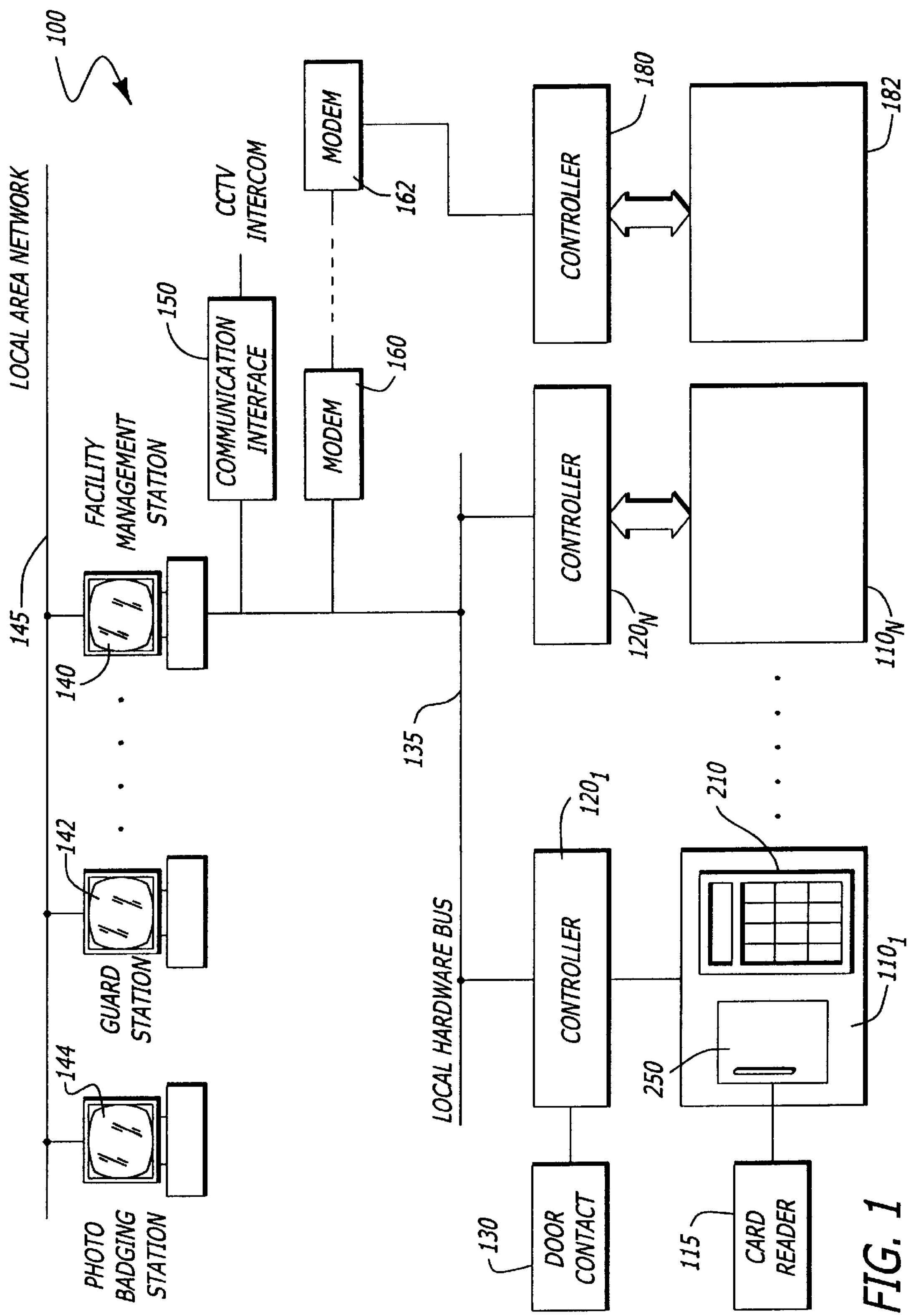
FIG. 1 is a block diagram illustrating one embodiment of an access system that operates in accordance with the teachings of the present invention.

Referring to FIG. 1, a block diagram illustrating one embodiment of a security access system 100 that operates in accordance with the teachings of the present invention is shown. System 100 comprises a number of integrated data entry units 110$_1$ through 110$_N$, a number of corresponding controllers 120$_1$ through 120$_N$, a card reader 115, an access control mechanism 130, a local hardwire bus 135, a central facility management station 140, a guard station 142, a photo badging station 144, a local area network 145, a communication interface unit 150, a local modem 160, a remote modem 162, a remote controller 180, and a remote data entry unit 182. As is known by one skilled in the art, a security access system may include any combination of the above elements. For example, a system may include only the integrated data entry unit 110$_1$, the card reader 115, the controller 120$_1$ and the access control mechanism 130.

Each of the integrated data entry units 110$_1$ through 110$_N$ comprises a keypad module 210 and a universal card reader interface 250. The keypad module 210 provides keyboard entry from a user. The universal card reader interface 250 accepts virtually all off-the-shelf card readers and converts the card encoded information into a compressed identification code. In one embodiment, the card reader is a proximity reader. The integrated data entry unit 110$_1$ will be described later.

Each of the controllers 120$_1$ through 120$_N$ is interfaced to a corresponding integrated data entry unit 110$_1$ through 110$_N$ to receive the keyboard entries and/or the card encoded information. The controller 120$_i$ (i=1, . . . , N) contains circuitry to activate the access control mechanism 130. The controller 120$_i$ is interfaced to the local hardwire bus 135 to the facility management station 140.

The access control mechanism 130 includes control mechanisms to activate access. These mechanisms include door relays, alarm relays, and other control relays. Heavy duty relays are used for control of electric door locks and strikes. The controller can be programmed via the keypad module or remotely via the central facility management 140 to activate relays for arming or disarming security systems, alarm annunciation, elevator floor control, HVAC control, lighting control and storage locker control. The relays are triggered by the corresponding keypad module codes, cards, time zone thresholds, alarms or custom logic. The access may include doors, turnstiles, elevator, cash dispenser (used in ATM), etc.

The local hardwire bus 135 connects the facility management station 140 to a number of devices. The local hardwire bus 135 may be implemented by electrical wires carrying analog or digital signals. The bus protocol may be any convenient protocol, including specialized protocols. The data format may be serial or parallel, or both.

The facility management station 140 is a central computer to perform security management functions in the facility. The facility management station 140 may be any appropriate workstation such as personal computers (PC) popularized by the Pentium-based machines. The facility management station 140 communicates with a number of devices via the local hardwire bus 135. These devices include the controllers $\mathbf{120}_i$ (i=1, . . . , N), the communication interface 150, and the local modem 160. The facility management station 140 is also connected to a local area network 145.

The communication interface 150 provides interface to other security or communication devices or systems such as closed circuit television (CCTV), intercom.

The local modem 160 provides connection to a remote system via telephone line. The remote system typically includes a remote modem 162, a remote controller 180, and a remote data entry unit 182.

The local area network (LAN) 145 connects a number of workstations together. Examples of these workstations include the facility management station 140, the guard station 142, and the photo badging station 144. The guard station 142 is situated at the guard site. The guard station 142 provides guard activities such as entry/exit log-in, contents search, alarm, etc. The photo badging station 144 produces the identification cards or badges for the employees or the authorized personnel.

The facility management station 140, the guard station 142, and the photo badging station 144 exchange information via the local area network 145. The facility management station 140 also allows the system administrator to update the database, assign new identification codes, modify assigned codes, and other maintenance activities.

Figure 2:
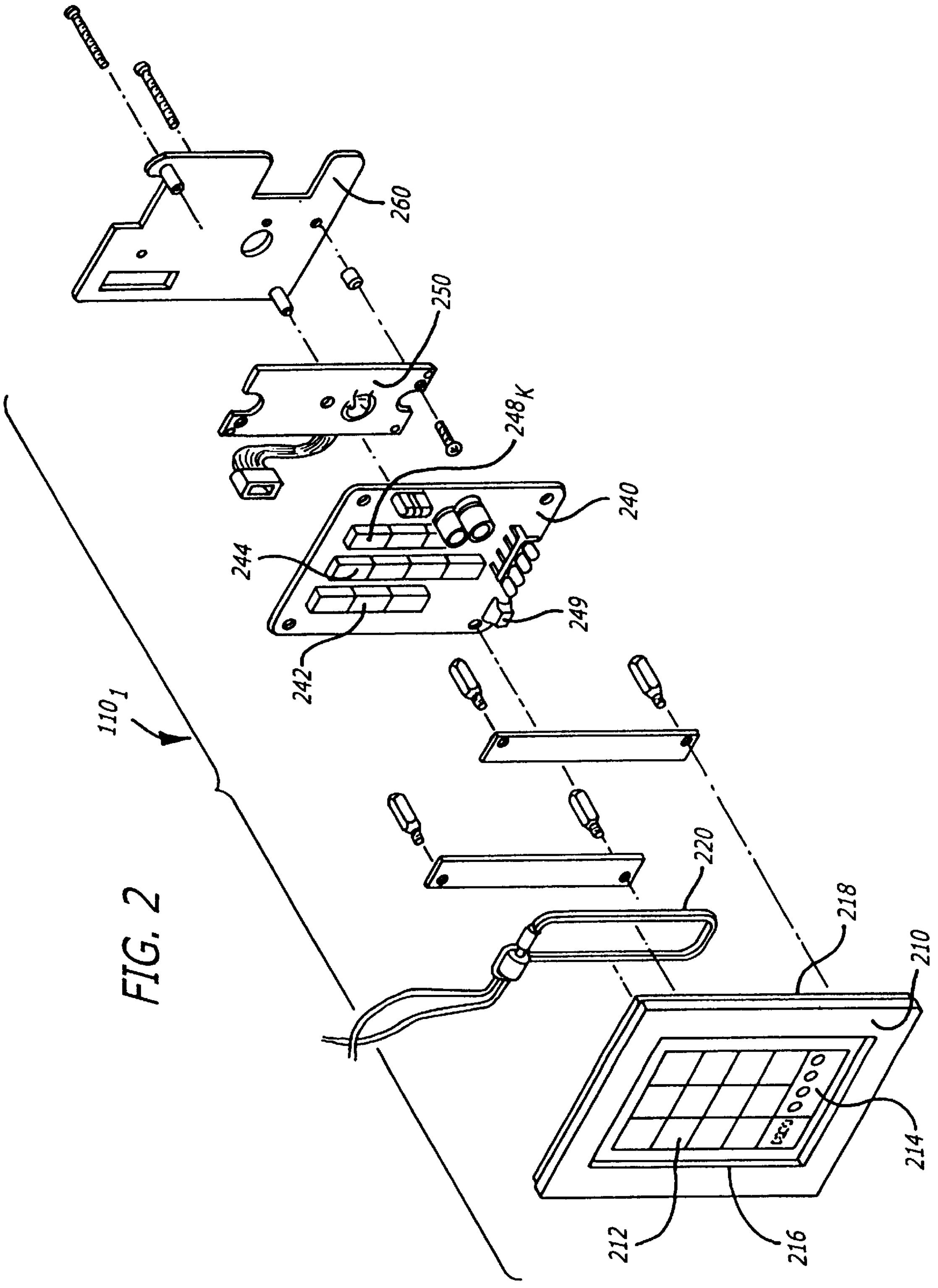
FIG. 2 is a diagram illustrating one embodiment of an integrated data entry unit that operates in accordance with the teachings of the present invention.

Referring to FIG. 2, a diagram illustrating one embodiment of an integrated data entry unit $\mathbf{110}_1$ that operates in accordance with the teachings of the present invention is shown. The integrated data entry unit $\mathbf{110}_1$ comprises a keypad module 210, a proximity sensing antenna 220, an electronic circuit board 240, a card reader interface 250, and a mounting plate 260.

The keypad module 210 includes a keyface area 212, an indicator panel 214, a viewing restrictor 216, and a keypad electronic interface 218. The keypad module 210 implements a secure keyboard data entry based on a random number display which scrambles the order of the numbers or symbols on the keyface area.

The keyface area 212 includes an array of display elements placed underneath a tactile membrane with see-through feature. The display elements may be any of a seven-segment light emitting diode (LED) display, a liquid crystal display (LCD), an incandescent display, a gas plasma display, a holographic display, a heads up display, a cathode ray tube (CRT) display, or any other available displays. The display may be lighted or non-lighted. The keyface as shown by the display elements includes a set of symbols used to represent the access code as entered by the user. In one embodiment, the set of symbols includes numeric symbols from 0 through 9. Other sets of symbols can be used such as alphanumeric, alphabets, telephone keypad symbols, or any specially designed symbols. A START key is provided to allow the user to initiate the key entry sequence. As will be explained later, an AUTO-START feature is included to allow the user to initiate the key entry sequence merely by waving the card in front of the keypad without pressing the START key. The AUTO START feature provides convenience to the user. The feature is implemented by the use of a hidden proximity sensor via the proximity sensor antenna 220 embedded within the keypad module 210.

The secure data entry via the keypad module 210 is achieved by randomly assigning the numbers or symbols to the keys on the keyface. Each time the START key is activated or when the AUTO-START is initiated, the numbers or symbols are scrambled to provide another random assignment. By changing the key numbers or symbols every time, the system prevents a bystander from recognizing the key sequence by observing the location of the keys being entered. The keypad module 210 can also be used to program the corresponding controller $\mathbf{120}_i$ to configure the access control mode.

In one embodiment, the keypad module 210 displays the symbols 0 through 9 on the keyface and accepts 3 to 8 digit codes. The number of random codes exceeds 111 million. The system administrator can assign the (PINs) Personal Identification Numbers or let the system randomly generate them.

In addition to the PIN code, the keypad module 210 may accept extension digits which allow the user to enter unique command functions.

Examples of these commands include door unlock/relock, alarm masking/unmasking, after-hours HVAC or lighting activation, remote control of mechanical or electrical systems, elevator floor requests, or other custom control sequences. Any code use provides an audit trail of who issued each command.

The indicator panel 214 includes visual and/or audible indicators such as LED's, speakers. The indicators generate signals to inform the user the conditions or status of the unit. For example, a flashing LED may indicate an error condition, an audible "beep" may indicate an incorrect data entry.

The viewing restrictor 216 further enhances the security of keypad data entry by limiting the viewing field. The viewing restrictor 216 includes horizontal and vertical light guides to limit the viewing field such that only the person directly in front of the keypad can see the display at the keyface area 212. The viewing restrictor 216 may be implemented by a set of louvers framed around the keyface area 212. In one embodiment, the viewing restrictions are +/−4 degree horizontal and +/−26 degree vertical. In another embodiment, the viewing restrictions are +/−20 degree horizontal and +/−26 degree vertical.

The keypad electronic interface 218 includes circuitry to interface to the control circuit in the electronic circuit board 240.

The proximity sensing antenna 220 is located behind the keypad module 210. The proximity sensing antenna 220 is essentially hidden inside the integrated data entry unit $\mathbf{110}_1$. Any movement by a proximity card, tag, etc. with properly encoded information in close proximity to the keyface area 212 is sensed by the proximity sensing antenna 220 and transmitted to the proximity sensor electronics. The proximity sensor is designed to read the encoded information embedded in the keycard. The START function may be activated automatically when a card is waved in front of the keyface area. In one embodiment, each time the START function is activated, the keypad is scrambled. The proximity sensor therefore provides a convenience and comfort for the user for entering keycard information.

The electronic circuit board 240 includes a circuit that provides overall control functions to the integrated data entry unit $110_1$ and the communication interface to the controller 120. The electronic circuit board 240 includes a microprocessor 242, a memory 244, and a number of peripheral devices $248_k$, and a selector switch 249.

The microprocessor 242 is any processor that can execute a program to control the integrated data entry unit $110_1$. The memory 244 contains program and data for use by the microprocessor 242. The peripheral devices $248_k$ (k=1, . . . , K) provide peripheral functions such as input/output port, serial communication interface, etc. The microprocessor 242 provides many functionalities for the integrated data entry unit $110_i$ by running the firmware stored in memory 244. Examples of these functionality's include keypad module control, random display generation, card reader control, and encoded information conversion algorithm.

In particular, the microprocessor 242 executes a routine to convert the encoded information read from the card by the card reader to a compressed identification code to be transmitted to the controller 120. The algorithm for this conversion will be explained later.

The electronic circuit board 240 also includes a selector switch 249 to select whether the integrated data entry unit $110_1$ can function as a scramble keypad only, as a card reader only, or both. The selector switch 249 may be implemented by a dual in line package (DIP switch), a jumper setting, a software or firmware implemented flag, or any convenient selector. The selector switch 249 can be either locally or remotely controlled.

Via the selector switch 249, the integrated data entry unit $110_1$ can be used as a scramble keypad unit only, a card reader only, or both. The benefits of this dual technology are numerous. First, it enhances the security of the system because an intruder will not know which access mode is being used. Second, it provides expandability for the system because the system administrator may start out with one mode and expand the system capabilities with the other mode. Third, it provides flexibility to the system because the same site can operate on two different modes depending on the time of day. For example, during day time, a card reader mode may be sufficient; at night, when the facility is more vulnerable, both the card reader mode and the scramble keypad mode may be needed.

The universal card reader interface module (UCRIM) 250 is installed at or near a conventional access control reader. It converts the card reader's analog or pulsed signals to a high security digital code. The card's raw code, the encoded information, is converted to a unique identification using the conversion algorithm described later. In one embodiment, a single card reader interface module 250 can support both an entrance and exit reader for the same door.

The universal card reader interface module (UCRIM) 250 supports virtually all types of commercially available cards. The data formats supported by the UCRIM 250 include ABA magnetic stripe, Wiegand (26- to 55-bit format), proximity, bar code, touch memory, barium ferrite, radio frequency (RF), and biometric.

The mounting plate 260 provides a solid support for the entire integrated data entry unit to be mounted on any access system. The mounting structure is compact with shallow depth, accommodating narrow walls and elevator cabs, or other applications where space is important.

Figure 3:
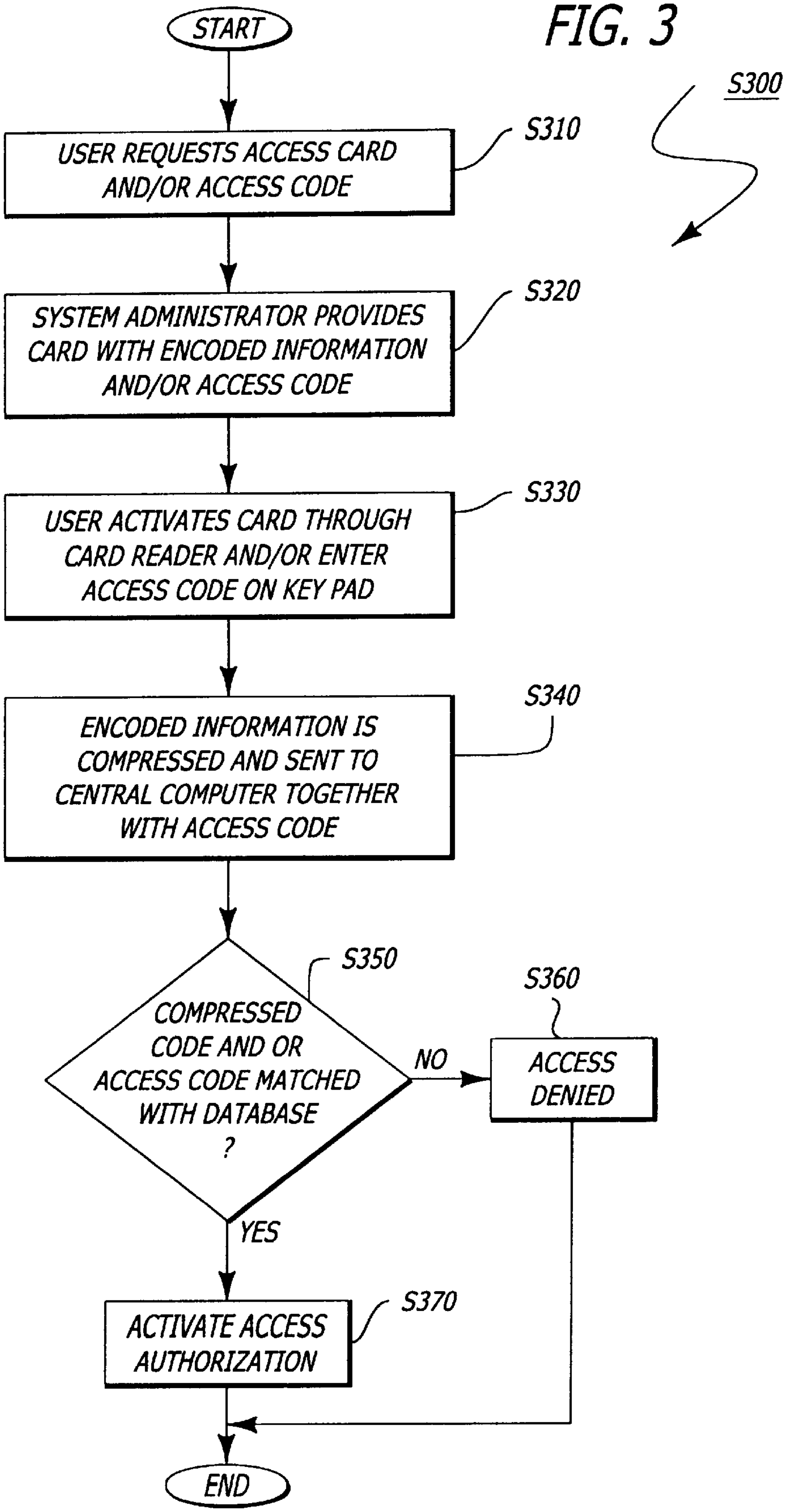
FIG. 3 is a flowchart illustrating a process that operates in accordance with the teachings of the present invention.

Referring to FIG. 3, a flowchart illustrating a process that operates in accordance with the teachings of the present invention is shown.

From a START state, process S300 enters step S310 where a user requests an access card and/or an access code. In a typical application, the user may be a new employee who is authorized to enter a room or a building. Depending on the security protocol established by the organization, the user may be issued an identification card only, an access code only, or both an identification card and an access code. The identification card is typically encoded with necessary identification information and security or authorization level. The process S300 then enters step S320. In step S320, the system administrator provides the user the encoded identification card and/or access code. The issued identification card and/or the access code is selected such that the resulting compressed identification code as processed by the integrated data entry unit is unique to the user.

The process S300 then enters step S330 where the user request access. If an identification card is provided, the user swipes the card through the card reader or merely waves the card near the keypad unit if a proximity card reader is installed. If an access code is provided, the user enters the code via the keypad module. If both identification card and access code are provided, the user swipes the card or presents the card near the unit (if a proximity card reader is used) and then enters the access code.

The process S300 then enters step S340 where the encoded information on the card or the access code is processed by the microprocessor. The encoded information is compressed to produce a unique identification code that is compatible with the format as stored in the database of the system. The compression algorithm will be explained later. Essentially the algorithm provides an irreversible compression of the encoded information. The compressed identification code is then transmitted to the controller for comparison with the database. Since the compressed code is sent rather than the original raw encoded information, the security is enhanced because it is not possible to convert the compressed code back to the original raw information.

The process S300 then enters step S350. In step S350, it is determined if the compressed code and/or the access code is matched with a valid code stored in the database. If there is no match, the process S300 enters step S360 to deny the access. If there is a match, the process S300 enters step S370 to activate the access authorization as established by the security protocol. For example, a door may be open, a turnstile may be unlocked, or a cash dispenser may be activated to prepare to dispose cash. The process S300 then stops.

The compression of the encoded information is based on an algorithm that provides a reduction in data size while maintaining the uniqueness of the identification code. In a typical application, the raw encoded data as read by the card reader is NK bytes in length. This encoded information is reduced to NI bytes corresponding to 2*NI decimal digits. In one embodiment, NK=32, NI=4, and the resulting compressed identification code is represented by 8 decimal digits. By reducing the size of the encoded identification information, a significant saving in storage amount and processing time is achieved.

Let d(I) be the array containing the NK bytes of encoded data read from the identification card by the card reader. The compression algorithm is represented by the following pseudo code:

```
for (I=0; I<NK-2; I++)
    d(I) = d(I) + d(I+1) + d(I+2);
```

-continued

```
for (I=0;I<NK−2;I++)
        d(I) = d(I) + d(I+1) + d(I+2)
for (I=0;I<NI; I++)
{
        m(I) = 0;
        for (k=0; k<NK; k+= (NK/NI))
                m(I) += d(I+k);
}
```

In the end, the array m(I) contains the compressed code. The array m(I) may be implemented by reusing the first NI elements of the array d(I).

Figure 4:
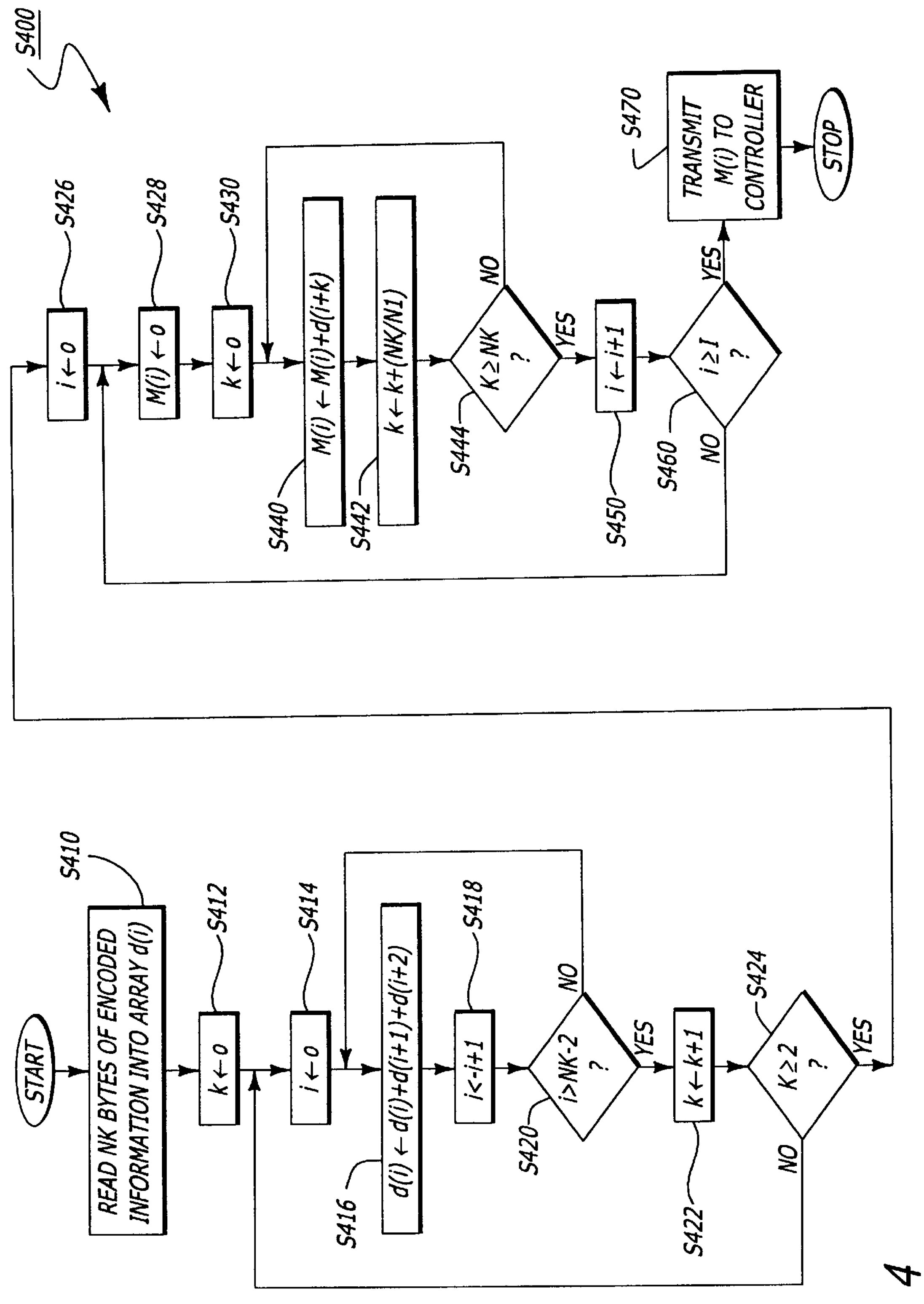
FIG. 4 is a flowchart illustrating a method to generate unique compressed identification code in accordance with the teachings of the present invention.

Referring to FIG. 4, a flowchart illustrating a process S400 to perform the compression algorithm in accordance with the teachings of the present invention is shown.

From a START state, the process S400 enters step S410. In step S410, the encoded information on the identification card is read into the array d(i). In step S412, the time index k is initialized to zero. In step S414, the array index i is initialized to 0. Then the process S400 enters step S416 to carry out the summation of three consecutive array elements. In step S418, the array index i is incremented. In step S420, it is determined if the array index i exceeds the upper bound NK-2. If not, the process S400 goes back to step S416. If the array index i exceeds the upper bound, the time index k is incremented in step S422. In step S424, if the time index k is not greater than or equal to 2, the process S400 returns to step S414 to repeat the summation.

If two summation loops have been done, the process S400 enters step S426 to initialize the array index i. Then the process S400 enters step S428 to initialize the array element m(i) in preparation for the summation. In step S430, the array index k is initialized to zero. The summation of the inner loops is performed in step S440. The summation is carried out over the array elements at NK/NI apart. In step S442, the inner array index k is incremented by an increment of NK/NI. It is then determined if the inner loop is completed at step S444. If not, the process S400 returns to step S440. If the inner loop is completed, the outer array index i is incremented in step S450. It is then determined if the outer array index i exceeds NI in step S460. If not, the process S400 returns to step S428 to prepare for the next inner loop summation. If the outer array index i exceeds NI, the compression is completed and the result is stored in the array m(i). The process S400 then enters step S470 to transmit the array m(i) to the controller. The process S400 then stops.

Thus, the present invention provides an integrated data entry system for access control with dual technology. The integrated data entry system provides high secure access control with flexibility, convenience, and compactness, suitable for use in public or private areas.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:

a keypad unit for displaying a plurality of randomly generated symbols on a keyface, said keyface including a plurality of keys, said keypad unit generating a signal representing one of the plurality of randomly generated symbols when a corresponding key on the keyface is activated;

a proximity sensor for sensing information encoded in a card near the keypad unit, the proximity sensor being hidden within the keypad unit;

a card reader interface circuit coupled to the proximity sensor for reading the encoded information from the card; and a control circuit coupled to the keypad unit and the card reader interface circuit, the control circuit converting said signal or said encoded information into an identification code.

2. The apparatus of claim 1 wherein the control circuit comprises:

a processor; and a memory couple to the processor for storing program code and data, the program code causing a control of an operation of the keypad unit and the card reader interface circuit.

3. The apparatus of claim 1 wherein the proximity sensor further comprises a sensor antenna.

4. The apparatus of claim 1 wherein the keypad unit further comprises an indicator for indicating an operational condition.

5. The apparatus of claim 1 wherein the keypad unit is activated when the proximity sensor detects the movement of the card near the keypad unit.

6. The apparatus of claim 1 wherein the card reader interface circuit is further coupled to a card reader.

7. The apparatus of claim 6 wherein the circuit further comprises a selector element for selecting an operation of the keypad unit and the card reader, the selector element being inaccessible to a user of the keypad unit and the card reader.

8. The apparatus of claim 1 wherein the keypad unit further comprises a viewing restrictor to limit a viewing field of the keyface.

9. A system comprising:

an integrated data entry unit for receiving an access entry request, the integrated data entry unit comprising a keypad unit, a proximity sensor, a card reader interface circuit, and a control circuit, the proximity sensor being hidden within the keypad unit;

a controller coupled to the integrated data entry unit for providing an access control based on the access entry request, the controller verifying the access entry request from an access authorization database; and an access control mechanism coupled to the controller for activating an access.

10. The system of claim 9 wherein the keypad unit displays a plurality of randomly generated symbols on a keyface, said keyface including a plurality of keys, said keypad unit generating a signal representing one of the plurality of randomly generated symbols when a corresponding key on the keyface is activated.

11. The system of claim 10 wherein the proximity sensor senses information encoded in a card near the keypad unit.

12. The system of claim 11 wherein the card reader interface circuit is coupled to the proximity sensor or a card reader for reading the encoded information from the card.

13. The system of claim 12 wherein the control circuit is coupled to the keypad unit and the card reader interface circuit for converting said signal or said encoded information into an identification code.

14. The system of claim 9 wherein the control circuit comprises:

a processor; and a memory coupled to the processor for storing program code and data, the program code causing a control of an operation of the keypad unit and the card reader interface circuit.

15. The system of claim 9 wherein the proximity sensor further comprises a sensor antenna.

16. The system of claim 9 wherein the keypad unit further comprises an indicator for indicating an operational condition.

17. The system of claim 11 wherein the keypad unit is activated when the proximity sensor detects a movement of the card near the keypad unit.

18. The system of claim 12 wherein the control circuit further comprises a selector element for selecting an operation of the keypad unit and the card reader, the selector element being inaccessible to a user of the keypad unit and the card reader.

19. The system of claim 10 wherein the keypad unit further comprises a viewing restrictor to limit a viewing field of the keyface.

20. The system of claim 9 further comprises:

a computer coupled to the controller via a local bus, the computer performing management functions for processing the access entry request.

21. The system of claim 20 further comprises a local and remote modems for controlling a remote access control unit, the local modem being coupled to the computer via the local bus, the remote modem being coupled to the remote access control unit and to the local modem via a communication channel.

* * * * *